United States Patent [19]
Glatt

[11] Patent Number: 5,926,209
[45] Date of Patent: *Jul. 20, 1999

[54] VIDEO CAMERA APPARATUS WITH COMPRESSION SYSTEM RESPONSIVE TO VIDEO CAMERA ADJUSTMENT

[75] Inventor: Terry Laurence Glatt, Oakland Park, Fla.

[73] Assignee: Sensormatic Electronics Corporation, Deerfield Beach, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/502,576

[22] Filed: Apr. 14, 1995

[51] Int. Cl.⁶ ........................................................ H04N 7/18
[52] U.S. Cl. ........................... 348/143; 348/416; 348/405; 348/211; 348/153; 348/699
[58] Field of Search ....................................... 348/208, 209, 348/210, 211, 143, 153, 154, 155, 169, 170, 171, 172, 416, 699, 405, 404, 700

[56] References Cited

U.S. PATENT DOCUMENTS

| | | | |
|---|---|---|---|
| 4,511,886 | 4/1985 | Rodriguez | 340/534 |
| 4,943,855 | 7/1990 | Bheda et al. | 348/405 |
| 5,103,306 | 4/1992 | Weiman et al. | 358/133 |
| 5,111,288 | 5/1992 | Blackshear | 358/108 |
| 5,144,450 | 9/1992 | Kikuchi et al. | 358/227 |
| 5,202,759 | 4/1993 | Laycock | 358/108 |
| 5,218,627 | 6/1993 | Corey et al. | 379/53 |
| 5,227,877 | 7/1993 | Yukitake | 358/136 |
| 5,236,199 | 8/1993 | Thompson, Jr. | 273/439 |
| 5,430,480 | 7/1995 | Allen et al. | 348/208 |
| 5,444,476 | 8/1995 | Conway | 348/15 |
| 5,509,009 | 4/1996 | Laycock et al. | 370/62 |
| 5,510,834 | 4/1996 | Weiss et al. | 348/699 |
| 5,521,634 | 5/1996 | McGary | 348/169 |
| 5,548,346 | 8/1996 | Mimura et al. | 348/15 |
| 5,598,209 | 1/1997 | Cortjens et al. | 348/211 |
| 5,619,183 | 4/1997 | Ziegra et al. | 340/505 |
| 5,625,410 | 4/1997 | Washino et al. | 348/154 |
| 5,652,619 | 7/1997 | Nakamura et al. | 348/211 |
| 5,793,367 | 8/1998 | Taguchi | 348/211 |

*Primary Examiner*—Anand S. Rao
*Attorney, Agent, or Firm*—Robin, Blecker & Daley

[57] ABSTRACT

A video camera apparatus and a video surveillance system having a video camera are provided with a video compression unit which utilizes quantization for spatial processing and motion vectors for temporal processing. The camera apparatus and surveillance system include a camera with an adjustment mechanism which allows panning, tiring, zooming and focusing of the camera. The adjustment mechanism has a device for generating adjustment indication signals which indicate the state of adjustment of the camera. The adjustment indication signals are generated by a remote control panel or by means of transducers which detect the state of panning, tilting, zooming or focusing. A processor generates an instruction to the compression unit to adjust the degree of compression processing by video compression unit in response to the adjustment indication signals. Spatial or temporal processing are traded off, depending on whether the adjustment indication signals indicate movement of the camera or zooming or focusing of the lens. The video surveillance system has a camera station containing a video camera, a compression unit and a line interface to allow the camera station to be connected to a monitoring station via a communication channel. The monitoring station has a control panel, a decompression unit and a line interface. Control signals including adjustment indication signals are generated at the control panel and transmitted to the camera station via the communication channel. Compressed video signals are received by the monitoring station for decompression and display.

34 Claims, 5 Drawing Sheets

VIDEO CAMERA APPARATUS WITH COMPRESSION SYSTEM RESPONSIVE TO VIDEO CAMERA ADJUSTMENT

BACKGROUND

The present invention relates generally to the field of video compression. More specifically, it relates to a system for using knowledge of the adjustment of a video camera to optimize the use of resources for compressing a video signal generated by the video camera.

Video surveillance cameras are commonly used to monitor premises for security purposes. Typically one or more video cameras are placed at various locations to be monitored. The output of the cameras may be viewed or recorded at a central station. It is also possible to have a number of video cameras distributed at locations which are remote from the central station. For example, cameras may be placed in several stores at various locations in a city and monitored from a central station. Remote cameras could also be placed at outlying parts of an airport and monitored centrally.

In such systems, it is necessary to transmit the information acquired by the video cameras to the central monitoring location. For this reason, it is often desirable to compress the video data so that it can be transmitted over a communications channel having a relatively narrow bandwidth.

Known video compression systems involve two basic forms of compression processing spatial and temporal. Spatial processing compresses information by transforming the picture elements within a particular frame of a video signal in accordance with a compression algorithm, thereby reducing the amount of information required for reproduction of the frame. In contrast, temporal processing takes into account the way in which information is changing with time. It therefore reduces the amount of information required for reproduction of a frame by taking into account changes in the picture which occur from frame to frame. These changes are reflected in motion vectors which are generated and transmitted instead of the actual contents of the video frames. A description of an implementation of spatial and temporal processing can be found in the MPEG compression recommendation ISO/IEC 1172-2 (referred to herein as the MPEG Standard).

The MPEG Standard is one of several well known standards for video processing. Conventional MPEG encoders allow the degree of spatial processing to be varied, for example to conserve memory by adjusting the quantization of information in a particular frame. Such encoders also have the facility to detect motion of the picture from frame to frame and adjust the degree of temporal processing (i.e. adjust the motion vectors).

Within a scene being monitored by a video camera, motion can occur due to movement of the subject (e.g. a person traversing the field of view of the camera), or as a result of movement of the camera (i.e. due to the panning, tilting, zooming or focusing of the camera). When the picture moves, the movement information must be extracted in order to generate motion vectors. Systems of the prior art (e.g. systems using MPEG-type compression) which perform temporal processing to convey motion information require relatively large amounts of memory space and computational power.

The present invention is directed to the use of known information about the movement of the video picture caused by movement due to the camera to reduce the computational and memory overhead required for compression of video data. Specifically, it uses information generated as a result of adjustments to the camera to adjust and thus trade off spatial processing against temporal processing. Rather than extracting the information from the video pictures, it obtains the information from the means by which the camera is actually being controlled.

SUMMARY OF THE INVENTION

The present invention is a video camera apparatus with compression processing and a method used with such an apparatus. The apparatus includes an adjustable video camera. The camera generates video signals made up of a plurality of video images. A degree of compression processing of the video signals is brought about by compression means, thus generating compressed video signal- A camera control system causes adjustment of the video camera. The camera control system comprises means for generating an adjustment indication signal indicative of adjustment of the video camera by the camera control system A processor outputs to the compression means, an instruction to vary the degree of compression processing in response to the adjustment indication signal produced by the control system. This a priori knowledge of the adjustment of the camera derived from the control system is thus used to vary the degree of compression processing.

DETAILED DESCRIPTION

The following is a detailed description of the invention. It is intended to be illustrative, and not limiting of the invention, the fill scope of which is to be determined by the appended claims.

Figure 1:
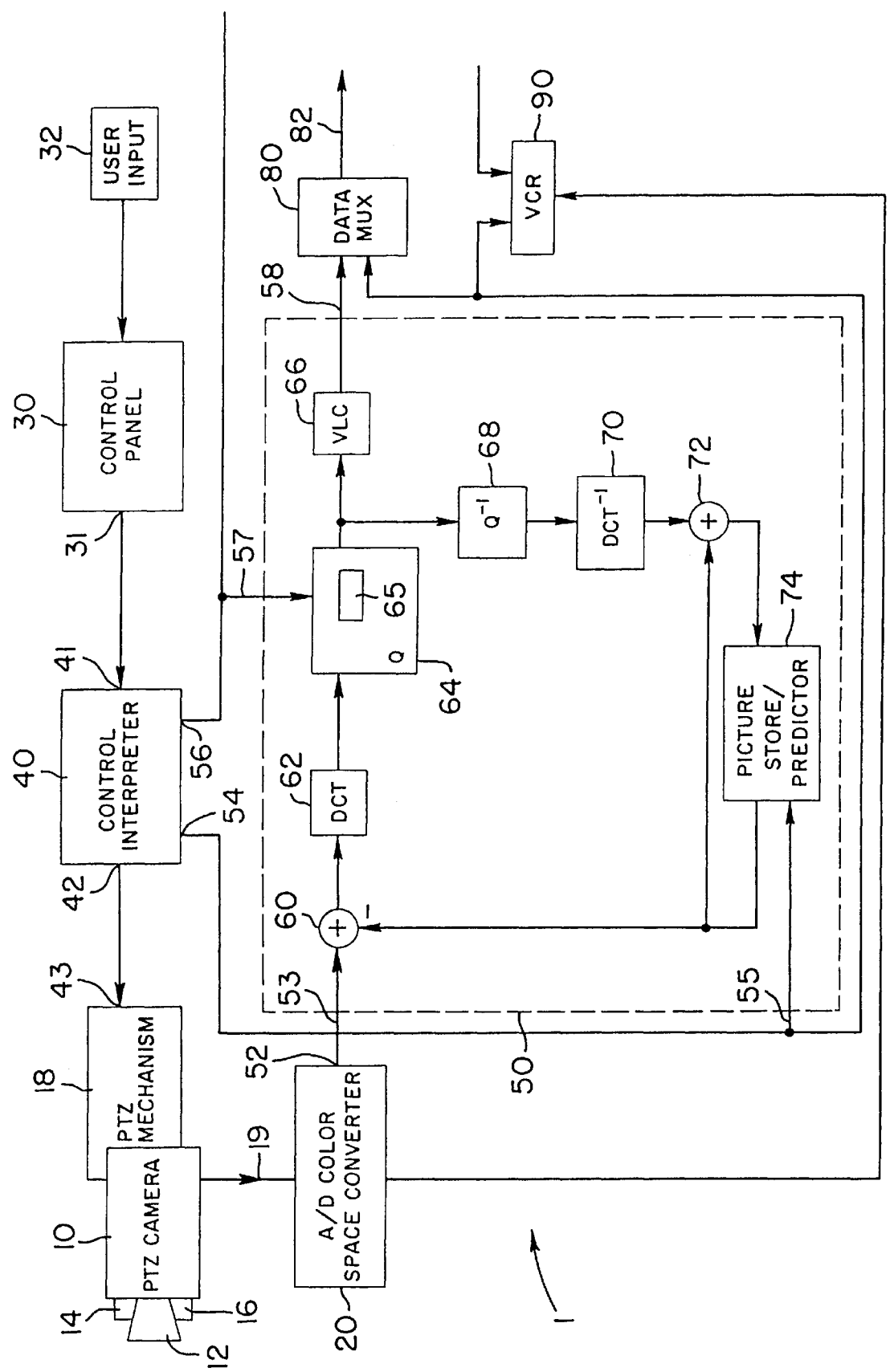
FIG. 1 is a block diagram of a first embodiment of the video camera apparatus of the invention.

Video camera apparatus 1 shown in FIG. 1 is made up of pan-tilt-zoom video camera 10 having A/ID color space converter 20 and pan-tilt-zoom ("PTZ") unit 18, control panel 30 with user input 32, control interpreter 40 (a suitably programmed microprocessor with associated memory) and a compression unit 50. Camera 10 produces a video signal 19 (made up of video images comprising picture elements) which is fed into color space converter 20, which in turn outputs digital chrominance and luminance signals Cr, Cb and Y at output 52. Camera 10 has zoom lens 12 having focus control mechanism 14 and zoom control mechanism 16. PTZ mechanism 18 enables camera 10 to pan, tilt and zoom on instructions input at control panel 30. Control panel 30 and control interpreter 40 are preferably included in a single microprocessor based unit available from Sensormatic Electronics Corp. of Deerfield Beach, Fla. under the name "Touchtracker." Camera 10, with its associated lens and PTZ unit 18 and color space converter 20 are preferably included in a self-contained "dome" available form Sensormatic Electronics Corp. under the name "SpeedDome."

Compression unit 50 is a conventional video compression unit comprising hardware and software which implements a compression algorithm—preferably the well-known MPEG system as described in the MPEG Standard. The MPEG Standard describes a system which effects a degree of compression processing (including spatial and temporal compression). Any compression system where the degree of compression processing can be varied can be used. For example, known systems having compression filters (having predetermined filter length, shape and coefficients) in which the degree of spatial compression is varied by adjusting filter length, adjusting filter coefficients or adjusting filter shape can be used and are considered to be equivalents represented by compression unit 50. Since the video compression hardware and software are well known to persons of ordinary skill in the art, only the aspects which are germane to this invention will be described.

Compression unit 50 has an input 53 connected to output 52 of color space converter 20 for receiving digitized chrominance signals Cr and Cb and luminance signal Y. It also has an input 55 for receiving motion vectors produced by control interpreter 40 at output 54. The generation and purpose of these motion vectors will be described below. Input 57 of compression unit 50 receives instructions as to the degree of spatial processing from output 56 of control interpreter 40, the details of which will be described below. Compression unit 50 has an output 58 for outputting a compressed video signal to multiplexer 80 for transmission over a communication channel.

The basic components of the preferred compression unit 50 are as follows: subtractor 60, discrete cosine transform unit 62, quantizer 64, variable length coder 66, de-quantizer 68, inverse discrete cosine transform unit 70, summing point 72 and picture store predictor 74. Quantizer 64 quantizes the discrete cosine transformed signal supplied by discrete cosine transform unit 62. The degree to which quantizer 64 effects spatial compression processing of the supplied signal is variable. To that end, quantizer 64 has at least two quantization matrices, each of which causes a different degree of spatial compression processing. Writing a variable into register 65 via input 57 causes one of the quantization matrices to be selected. All of these components are well known to persons of ordinary skill in the art, being described in detail in the MPEG manual.

As discussed above, the MPEG standard, as well as other compression systems, includes two modes of compression processing—spatial and temporal In the spatial compression processing mode, compression unit 50 compresses information within a video frame generated by video camera 10. Each video frame carries images made up of a large number of picture elements. In the temporal compression processing mode, motion vectors are generated to describe changes in a picture from one frame to another. The motion vectors thus are an indication of the motion of the images carried by the video frames.

When camera 10 is stationary, the differences from frame to frame of the video signal it produces are less significant than when the camera is panning, tilting, zooming or focusing. Further, when the camera is stationary, the human eye is more able to discern picture details than when the camera is in motion. Therefore, the compression operation must convey greater detail within each frame when the camera is stationary than when it is in motion- That is to say, when the camera is stationary, the degree of spatial processing must be low In the case of the preferred processing system described herein, this corresponds to a low degree of quantization.

When the camera is in motion, zooming or focusing, in order for the signal to be accurately reconstructed, the compression operation must convey more information as to how the picture is changing. This requires greater bandwidth than when the camera is stationary. Increasing the degree of spatial compression (i.e. increasing the spatial quantization) frees bandwidth for temporal compression processing (i.e. the generation of motion vectors) in response to panning, tilting, zooming or focusing. However, this results in less detail appearing when the compressed signal is reconstructed. Nevertheless, this is an acceptable solution because the human eye is less sensitive to detail in a moving object than in a still one.

When camera 10 is stationary, focused and lens 12 is not being zoomed, control interpreter 40 does not perform temporal compression processing (i.e., it does produce motion vectors). The degree of spatial compression is low. That is to say, a quantization matrix giving a low quantization is selected by writing an appropriate value into register 65. This results in a high degree of detail being conveyed in the compressed signal at output 58.

The video signals at output 52 which are fed into compression unit 50 at input 53 are compressed in accordance with the MPEG algorithm using the degree of spatial compression processing set by control interpreter 40 and made available as a compressed video signal at output 58. This signal is passed to output 82 by multiplexer 80 for transmission over a communications channel or to a storage device.

Control panel 30, control interpreter 40 and PTZ unit 18 make up a camera control system When the user inducts camera 10 to pan, tilt, zoom or focus by means of user input 32, control panel 30 produces a control signal at output 31. This is fed into control interpreter 40 at input 41. In response, control interpreter 40 generates an adjustment indication signal at output 42 which is provided to input 43 of PTZ unit 18 to cause camera 10 to pan, tilt, zoom, or focus. In response to the adjustment indication signal, control interpreter 40 generates a series of motion vectors. The motion vectors describe how the picture produced by camera 10 is changing due to the instruction received from the user. The motion vectors are output in a format dictated by the MPEG Standard, thus effecting temporal compression processing. The motion vectors are stored in a look up table in the memory of control interpreter 40. Thus, for any particular degree of panning, tilting, zooming or focusing, there is a particular set of motion vectors in the look up table. Vectors indicative of combined panning, tiling, zooming or focusing are obtained by multiplying each of the vectors associated with the particular degree of panning, tilting, zooming or focusing by each other. The motion vectors are fed into multiplexer 80 and multiplexed with the compressed signal produced as a result of the spatial compression.

When the camera control system causes camera 10 to be adjusted (panned, tilted, zoomed or focused), control interpreter 40 outputs an instruction to compression unit to increase the degree of spatial compression processing. In the preferred embodiment, control interpreter instructs quantizer 64 to select the quantization matrix to produce a higher degree of spatial compression by causing an appropriate value to be written into register 65. As panning, tilting, zooming and focusing increases or decreases, so control interpreter 40 outputs instructions to compression unit 40 to increase or decrease the degree of spatial compression processing in appropriate proportion. Thus, when camera is caused to move relative to its surroundings or to zoom or focus, the compression operation is weighted towards the frame to frame changes in the picture (temporal compression processing), rather than towards the details of each frame (spatial compression processing).

When the panning, tilting, zooming and focusing have stopped, control interpreter 40 stops producing the motion vectors. It also causes the degree of spatial compression processing to be adjusted back to an appropriate lower level. The system just described allows the degree of compression processing to be varied depending on adjustment of the video camera. This allows a tradeoff between the degree spatial and temporal processing on the basis of a priori knowledge of whether the camera is panning, tiling, zooming or focusing. The system has been described by reference to a system in which the degree of spatial compression processing is varied by adjusting the quantization of an MPEG-type compression processing system. A person of ordinary ski in the art will recognize that the principles of the preferred embodiment of this invention are equally applicable to systems which use different forms of compression processing and in which the degree of compression processing can be varied.

The system can also have the capability to record the video images produced by camera 10. The instructions to vary the degree of compression processing are provided to video cassette recorder 90 and stored on the video tape between frames of the video signal That is to say, the instructions output by control interpreter 50 and/or the motion vectors are stored on the video tape. Thus, when the video tape is replayed into a compression unit 50, the instructions to vary the degree of spatial and/or temporal compression and the motion vectors are extracted from the recorded signal and used in the manner described above.

Figure 2:
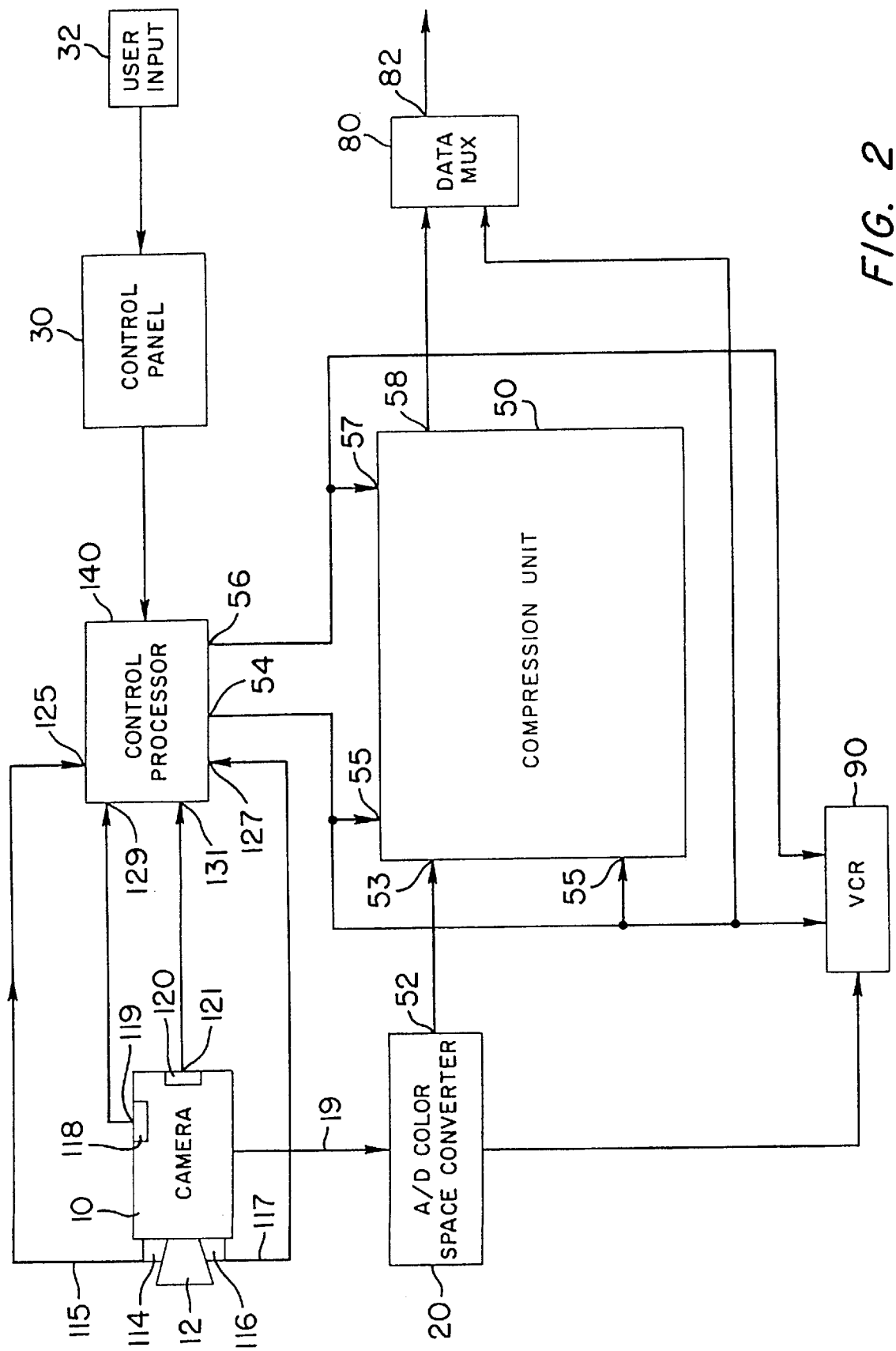
FIG. 2 is a block diagram of a second embodiment of the video camera apparatus of the invention.

In a second embodiment of the invention shown in FIG. 2, the adjustment indication signals are produced by transducers which detect the state of panning, tilting, zooming or focusing, rather than control signals produced by the control panel. Transducer 118 detects the state of panning of camera 10 and produces a panning adjustment signal at output 119. Transducer 120 detects the state of tilting of camera 10 and produces a tilting adjustment signal at output 121. Transducer 114 detects the state of zooming of lens 12 and produces a zoom indicating signal at output 115. Transducer 116 detects the state of focusing of lens 12 and produces a focus adjustment signal at output 117. The signals produced by transducers 114, 116, 118 and 120 at outputs 115, 117, 119 and 121 respectively are fed into processor inputs 125, 127, 129 and 132 respectively. Processor 140 produces outputs 154 and 156. Those outputs are identical to outputs 54 and 56 described above and are used in the same way.

Figure 3:
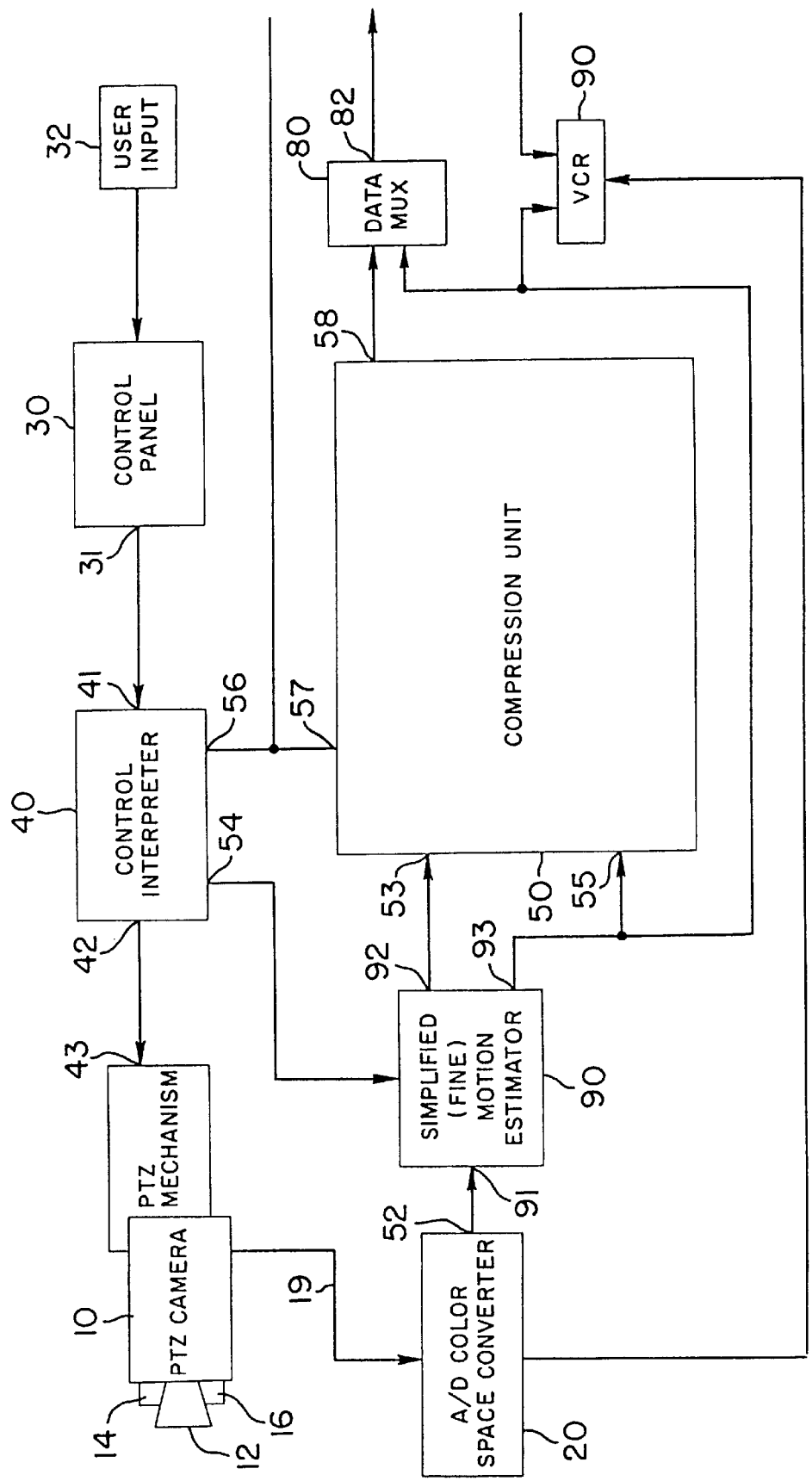
FIG. 3 is a block diagram of a third embodiment of the video camera apparatus of the invention.

A third embodiment of the invention is shown in FIG. 3. This third embodiment is identical to the first embodiment, except that it includes simplified fine motion estimator 90. This unit is identical to a conventional motion estimator described in the MPEG Standard Motion estimator 90 receives at input 91 the signal produced by color space converter 20. It produces at outputs 92 and 93 composite motion vectors in accordance with the MPEG Standard. Those vectors are multiplied by the vectors produced by control interpreter 40 to produce a more refined motion vector.

The systems described above are designed to be part of a video surveillance system which allows monitoring from a remote location. The following is a description of such a system.

Figure 4:
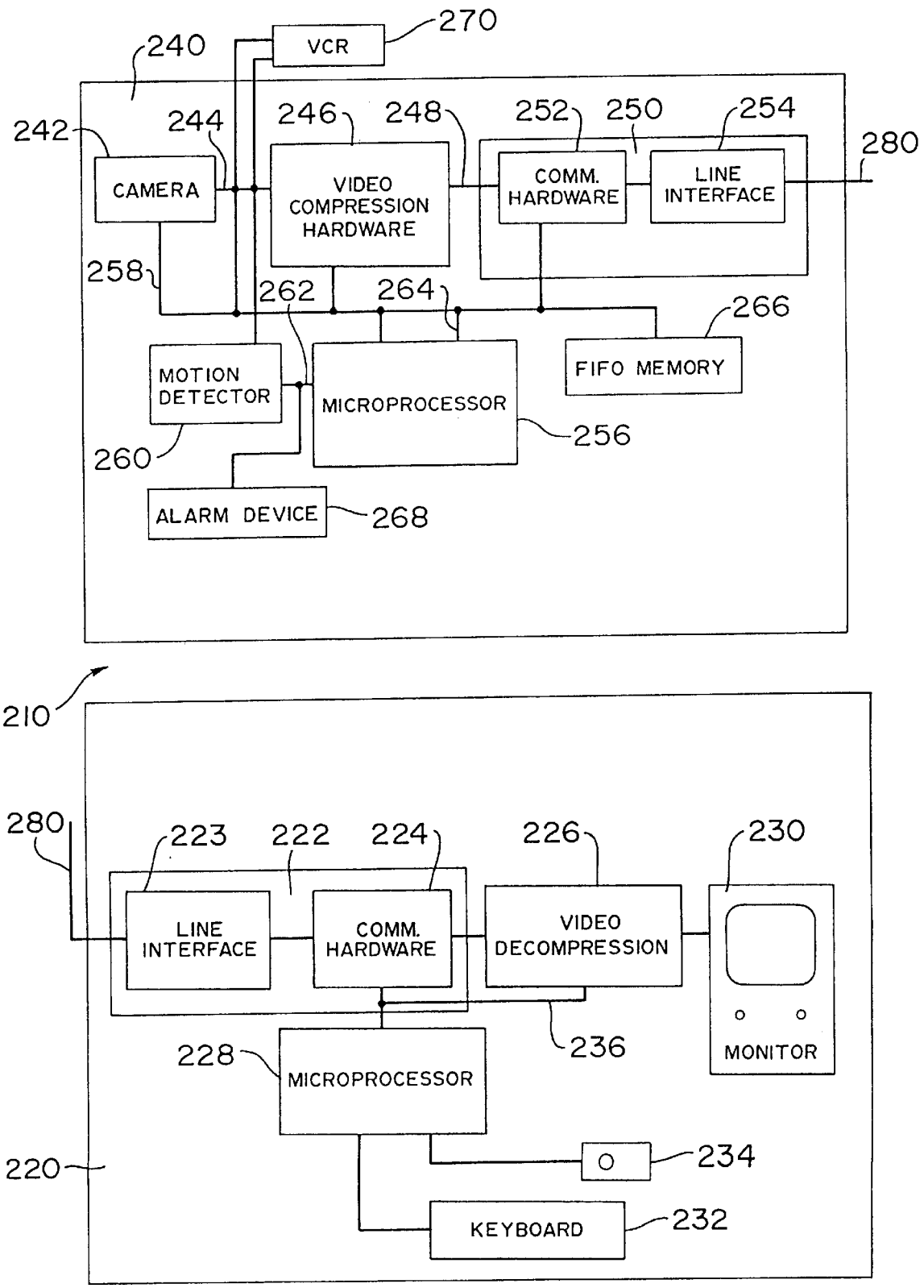
FIG. 4 is a block diagram of a video surveillance system of the invention; an&

A video surveillance system 210 incorporating the above-described apparatus is shown in block diagram form in FIG. 4. The surveillance system described below incorporates the first embodiment of the invention (FIG. 1). However, the following description will-enable a person of ordinary skill in the art to make a surveillance system incorporating the first, second or third embodiment.

System 210 is made up of monitoring station 220 and video camera module 240. Monitoring station 220 communicates with video camera module 240 via public switched communications network 280. Network 280 is preferably a standard telephone network such as that operated by a local telephone company. Network 280 may for example also be a fiber optic network, a cellular network, a local area network such as an ethernet or a local ISDN network.

While system 210 is described and illustrated with only one monitoring station and one camera module, a plurality of monitoring and camera modules can be connected via the communications network utilizing the switching capabilities of the network.

Video camera module 240 having video camera 242 is at a location which is remote from monitoring station 220. For example, the came module maybe in one of several stores at various locations in a town. The present invention allows all camera modules to be monitored from a central monitoring location via a public telephone network. A large airport may be another site for system 210. Outlying buildings may be monitored from a central location. The outlying locations are likely to be connected to the central monitoring location via the telephone network so, using the present invention, no additional wiring is needed to connect the video camera module to the monitoring station.

Monitoring station 220 has a network interface 222 for connection of the monitoring station to network 280. Network interface 222 is made up of a telephone line interface 223 and communications hardware 224—contained in an ISDN basic rate interface or a-modem Networks of the type with which the present invention is intended to function typically operate at speeds of between 28 and 128 thousand bits per second. However, video data typically requires transmission speeds of approximately 80 million bits per second. The video data acquired by camera 242 is therefore compressed at camera module 240 by means of the compression system described above. Signal processor 226 is thus provided for decompressing compressed image signals received from camera module 240. Network interface 222 and decompression circuit 226 are controlled by microprocessor 228—for example a Motorola 68030, Intel 486 or equivalent microprocessor. Monitoring station 220 includes a video monitor 230. Microprocessor 228 controls the overall operation of monitoring station 220. To allow the flow of control signals, data bus 236 connects microprocessor 228 to network interface 222. A user interface in the form of keyboard 232 and mouse or trackball input device 234 (preferably a Touchtracker camera controller available form Sensormatic Electronics Corp. of Deerfield Beach, Fla.) is provided to enable the operator to enter instructions which microprocessor 228 causes to be transmitted to video camera module 240 via communications network 280. Instructions can thus be transmitted from monitoring station 220 to camera module 240 in order to control remotely any of the operations of camera module 240. For example, the user can instruct camera 242 to pan, tilt, zoom or focus. Keyboard 232 and input device 234 thus perform the functions of control panel 30 and user input 32 described above with reference to FIG. 1. Systems for performing such control operations are disclosed in copending U.S. patent application Ser. No. 08/166,599, which is incorporated herein by reference. The control signals are transmitted to camera module 240 over communications, channel 280.

Camera module 240 is an integrated unit including a video surveillance camera 242 for monitoring an area, video compression unit 246 and network interface 250. Camera 242 generates video image signals 244 which are fed into video compression unit 246. Compression unit 246 is the same as video compression unit 50 described above with reference to FIG. 1. Video compression unit 246 is preferably a video compression set available from Integrated Information Technology, Inc. of Santa Clara, Calif. under the name Vision Controller/Vision Processor or equivalent compression circuitry. It includes data multiplexer 80 described above. The processed signals 248 are fed into network interface 250 which connects camera 242 to network 280. Network interface 250, made up of communications hardware 252 and line interface 254, is essentially the same as network interface 222 in monitoring station 220. Microprocessor 256, which may be of the of the same type as microprocessor 228, controls the operation of camera 242, and network interface 250. Data bus 258 carries control data between microprocessor 256 and camera 242, video compression hardware 246 and network interface 250. Microprocessor 228 receives (via communications channel 280) the control signals generated by keyboard 232, input device 234 and microprocessor 228 at monitoring station 220. Microprocessor 256 is also programmed to perform the functions of control interpreter 40 described above with reference to FIG. 1. That is to say, microprocessor 228 converts the control signals it receives from monitoring station 220 into camera adjustment indication signals which are transmitted to camera 242 over data bus 258. Instructions to compression unit 246 to alter the compression parameter are also produced by microprocessor 256 in response to the camera adjustment indication signals and provided to the appropriate pin of compression unit 246 via data bus 258. Motion vectors are likewise generated in response to the camera adjustment indication signals by microprocessor 256 and supplied to compression unit 246 to be multiplexed.

Camera module 240 is provided with memory capability in the form of a digital first-in-first-out (FIFO) memory 266 comprising a disk drive or random access memory. Memory 266 stores the processed image signals 248 over a predetermined time period, for example 3 minutes. Memory 266 therefore keeps a continuous record of what camera 242 has acquired over the preceding predetermined time period. Memory 266 is connected to microprocessor 256 by data bus 258. Further storage unit 270 in the form of a video cassette recorder (VCR) disk or random access memory is connected to camera 242 and compression unit 246 such that it can record the output of camera 242 and play back into compression unit 246. In this embodiment, outputs 54 and 56 of control interpreter 40 are stored along with the output of camera 242. Alternatively, data can be fed from compression unit 246 into storage unit 270 so that it is stored in compressed form. Storage unit 270 can be used in a variety of ways, some of which are described below. The operation of storage unit 270 can be controlled by microprocessor 256 via data bus 258. Any electronically controllable VCR can be used, for example, the Panasonic AG-6730.

Camera module 240 also includes a motion detector 260 which analyzes video image signals 244 output by camera 242 to determine whether the subject of the surveillance by camera 242 has moved. Motion detector is connected to microprocessor 256 by means of data bus 258. Camera module 240 is also provided with an alarm device interface 268 connected to microprocessor 256. Alarm device interface facilitates the receipt by microprocessor 256 of various different types of alarms thereby triggering recording in memory 266 or or storage unit 270 or transmission over network 280. If motion detector 260 detects movement in the subject or if an alarm signal is received via alarm interface 268, a signal 262 is generated and sent to microprocessor 256. Microprocessor 256 generates a start signal 264 in response to signal 262, thereby causing second interface 250 to begin transmitting video images processed by signal processor 246 over network 280.

When an alarm or motion detection signal 262 is generated and received by microprocessor 256, microprocessor 256 can initiate various operations. For example, it can instruct storage unit 270 to start recording, change the mode of recording from time lapse to real time, cause the output of camera 242 to be compressed and transmitted over network 280 or cause the contents of memory 266 or storage unit 270 to be output to network 280, all depending on the manner in which microprocessor 256 is programmed and how the system is configured. Start signal 264 can also be initiated from monitoring station 220.

In the preferred embodiment in which network 280 is a public switched telephone network, camera module 240 and monitoring station 220 each have their own telephone numbers. Line interfaces 223 and 254 are able to initiate communications by dialing each other or dialing other modules connected to network 280. Thus, for example, if microprocessor 256 generates a start signal as described above (e.g. in response to the detection of motion), line interface 254 of camera module 240 dials up monitoring station 220. The call is received by line interface 223 of monitoring station 220. A handshaking process between camera module 240 and monitoring station 220 is then initiated, resulting in the reception by interface 222 of compressed video data from interface 250. Decompression circuit 226 decompresses the received compressed data so that it can be displayed on monitor 230.

Similarly, in response to a start signal generated by a user or alarm microprocessor 228 can initiate communications by causing monitoring station 220 to dial camera module 240 and receive data from camera 242, storage unit 270 or memory 266. The operation of each element of camera module 240 can be controlled from monitoring station 220 once communication has been established between the camera module and the monitoring station.

The invention can preferably operate in two modes. In the first mode, monitoring station 220 dials up camera module 240 by initiating a call using first network interface 222. Thereafter, a user at monitoring station 220 can control the operation of camera module 240 remotely by means of keyboard 232 or input device 234. For example, the user could instruct camera module 240 to output the contents of memory 266, play back the contents of storage unit 270 or simply monitor the output of camera 242 in real time. In the second mode, camera module 240 initiates a call to monitoring station 220. For, example, an alarm event detected by camera module 240 may cause it to initiate a call to monitoring station 220. Camera module 240 will then transmit live data acquired by camera 242, play back the contents of 266 or storage unit 270.

Figure 5:
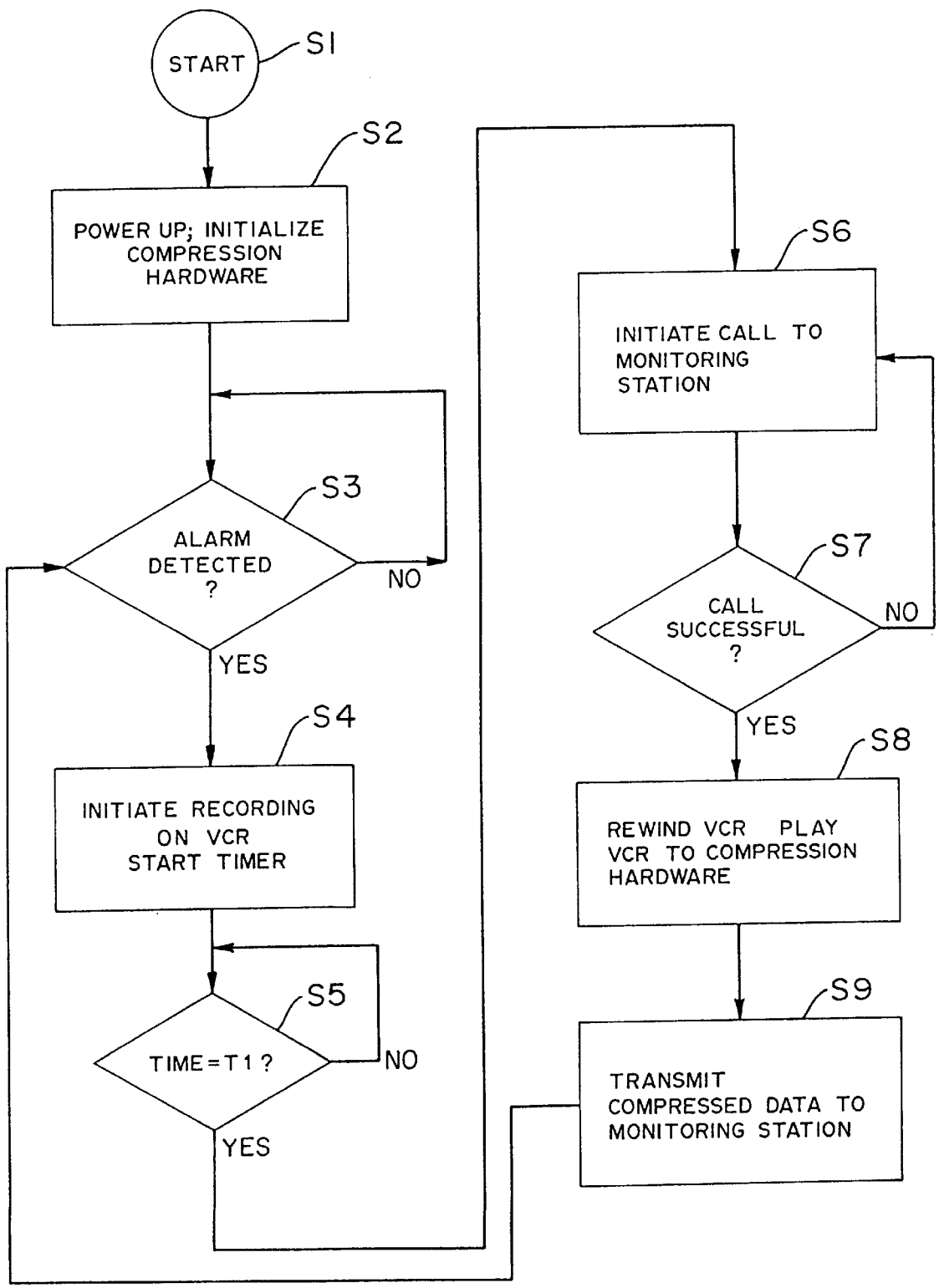
FIG. 5 is a flow chart showing the method of operation of the video surveillance system of the invention.

FIG. 5 is a flow chart of a preferred method of operation. The steps of the method described in FIG. 5 are indicated by numerals preceded by an "S." In the method of FIG. 2, the operation of camera module 240 commences with the powering up of camera module 240 and the initialization of video compression hardware 246 (steps S1 and S2). The initialization of compression unit 246 includes the downloading of operation codes to the RISC processor of compression unit 256 as welt as the downloading of parameters such as the data rate and initial quantization parameter for the compression process. Microprocessor 256 continuously monitors alarm interface 268 and motion detector 260 (S3). If a triggering condition in the form of an alarm, for example a door being opened or motion being detected, microprocessor 256 sends an instruction along data bus 258 to storage unit 270 to start recording and a timer is set within the microprocessor (S4). Recording continues for a predetermined time T1 (S5). At the end of T1, microprocessor 256 instructs communications hardware 252 to initiate a call to monitoring station 220 over network 280 (S6). A predetermined number of attempts are made to complete the call until the call is successful (S7). If the call is successful, microprocessor 256 instructs storage unit 270 to output what it has just recorded into compression unit 246. Alternatively, this step can be bypassed if the information is stored in storage unit 270 in compressed for Microprocessor 256 intrusts communications hardware 252 to transmit the compressed output of compression unit 246 through network 280 (S9) to monitoring station 220. The compressed data is decompressed by decompression unit 226 and the images recorded by storage unit 270 are displayed on monitor 230.

In the method described above, memory 266 could be substituted for storage unit 270. Alternatively, instead of the transmission of recorded information to monitoring station 220, microprocessor 256 could transmit the real time output of camera 242 in compressed form along network 280. Alternatively, the video data output of camera 242 can be continuously stored in memory 266 over a period of time equal to T. Thus, at any given time the video data for the preceding T seconds is stored in memory 266. When a triggering condition occurs, and a call is initiated to monitoring station 220, the compressed video data stored over the immediately preceding T seconds is output by memory 266, and transmitted to monitoring station 220. This allows the monitoring module to obtain information about what happened immediately before the triggering event. Instead of using memory 266, a second standby storage unit in addition to storage unit 270 can be added so that at any given time the output of video camera 242 would be recorded. That is to say that when one storage unit fills up, the other begins to record and the first stands by for the second to fill up. Alternatively, video data sampled at predetermined intervals could be stored in memory 266.

I claim:

1. A video camera apparatus comprising:
   a video camera comprising a lens, and for generating the video signals comprising a plurality of video images;
   a camera control system for causing adjustment of the video camera, the camera control system comprising means for generating an adjustment indication signal indicative of adjustment of the video camera by the camera control system;
   compression means effecting a degree of compression processing on the video signals, said compression means comprising: means for effecting a degree of spatial compression processing on the video signals; and means for effecting a degree of temporal compression processing on the video signals including means for generating motion vectors in response to the adjustment indication signal;
   a processor for outputting to the compression means, an instruction to vary the degree of compression processing in response to the adjustment indication signal, said instruction to vary the degree of compression processing comprising instructions to vary the degree of spatial compression processing and the degree of temporal compression processing in response to the adjustment indication signal.

2. The video camera apparatus of claim 1 wherein the means for effecting a degree of spatial compression comprises a quantizer for effecting a degree of quantization of the video signals and wherein the instruction to vary the degree of spatial compression processing in response to the adjustment indication signal comprises an instruction to the compression means to vary the degree of quantization of the video signals by the quantizer.

3. The video camera apparatus of claim 1 wherein the means for effecting a degree of spatial compression comprises at least one compression filter having a filter length and wherein the instruction to vary the degree of spatial compression in response to the adjustment indication signal comprises an instruction to vary the filter length.

4. The video camera apparatus of claim 1 wherein the means for effecting a degree of spatial compression comprises a filter having a plurality of filter coefficients and wherein the instruction to vary the degree of spatial compression in response to the adjustment indication signal comprises an instruction to vary at least one of the filter coefficients.

5. The video camera apparatus of claim 1 wherein the means for effecting a degree of spatial compression comprises a compression filter having a filter shape and wherein the instruction to vary the degree of spatial compression in response to the adjustment indication signal comprises an instruction to vary the filter shape.

6. The video camera apparatus of claim 1 wherein the camera control system comprises a remote controller.

7. The video camera of claim 6 wherein the remote controller comprises means for generating a control signal for causing adjustment of the video camera, wherein the control signal is provided to the means for generating an adjustment indication signal and wherein the means for generating an adjustment indication signal generates the adjustment indication signal in response to the control signal.

8. The video camera apparatus of claim 1 wherein the camera control system comprises a transducer for detecting the adjustment of the video camera and generating the adjustment indication signal in response to detection of the adjustment of the video camera.

9. The video camera apparatus of claim 1 wherein the processor outputs an instruction to the compression means to increase the degree of spatial compression processing on commencement of the adjustment of the video camera.

10. The video camera apparatus of claim 1 wherein the processor outputs an instruction to the compression means to decrease the degree of spatial compression processing on cessation of the adjustment of the video camera.

11. The video camera apparatus of claim 1 wherein the processor outputs an instruction to the compression means to vary the degree of spatial compression processing in proportion to the adjustment of the video camera.

12. The video camera apparatus of claim 1 wherein said motion vectors comprise information relating to frame to frame changes in the video images.

13. The video camera apparatus of claim 1 further comprising means for analyzing the video images to determine whether the video images are moving and for generating motion vectors if the picture video images are moving, the motion vectors comprising information relating to movement of the video images.

14. The video camera apparatus of claim 1 wherein the adjust indication signal indicates palming of the video camera.

15. The video camera apparatus of claim 1 wherein the adjustment indication signal indicates tilting of the video camera.

16. The video camera apparatus of claim 1 wherein the adjustment indication signal indicates zooming of the lens.

17. The video camera apparatus of claim 1 wherein the adjustment indication signal indicates focusing of the lens.

18. The video camera apparatus of claim 1 further comprising means for storing the video signals on a storage medium and wherein the instruction to vary the degree of compression processing is stored on the storage medium.

19. The video camera apparatus of claim 18 further comprising means for storing the video signals on a storage medium and wherein the instruction to vary the degree of temporal compression processing is stored on the storage medium.

20. The video camera apparatus of claim 1 wherein if the adjustment of the video camera is such that the video images move, the degree of spatial compression processing is decreased and the degree of temporal compression is increased.

21. A video surveillance system for surveillance of a remote location, the system comprising:
   a video camera module at the remote location, the video camera module comprising:
      a video camera for generating video signals;
      a first network interface connecting the video camera module to a communications network, such that with the video camera module connected to the communications network, the video camera module can communicate with a monitoring station over the communications network;
      a camera control system for causing adjustment of the video camera, the camera control system comprising means for generating an adjustment indication signal indicative of adjustment of the video camera by the camera control system;
      compression means effecting a degree of compression processing on the video signals, said compression means comprising: means for effecting a decree of spatial compression processing on the video signals; and means for effecting a degree of temporal compression processing on the video signals including means for generating motion vectors in response to the adjustment indication signal:
      a processor for outputting to the compression means, an instruction to vary the degree of compression processing in response to the adjustment indication signal, said instruction to vary the degree of compression processing comprising instructions to vary the degree of spatial compression processing and the degree of temporal compression processing in response to the adjustment indication signal.

22. The video surveillance system of claim 21 further comprising a monitoring station comprising a second network interface for connection to the network.

23. The video surveillance system of claim 21 further comprising means for analyzing the video images to determine whether the video images are moving and for generating motion vectors if the picture video images are moving, the motion vectors comprising information relating to movement of the video images.

24. The video surveillance system of claim 21 wherein the adjustment indication signal indicates panning of the video camera.

25. The video surveillance system of claim 21 wherein the adjustment indication signal indicates tilting of the video camera.

26. The video surveillance system of claim 21 wherein the adjustment indication signal indicates zooming of the lens.

27. The video surveillance system of claim 22 wherein the adjustment indication signal indicates focusing of the lens.

28. The video surveillance system of claim 21 further comprising means for storing the video signals on a storage medium and wherein the instruction to vary the degree of compression processing is stored on the storage medium.

29. The video camera apparatus of claim 19 further comprising means for storing the video signals on a storage medium and wherein the instruction to vary the degree of temporal compression processing is stored on the storage medium.

30. The video camera apparatus of claim 21 further comprising means for storing the video signals on a storage medium and wherein the instruction to vary the degree of spatial compression processing is stored on the storage medium.

31. A video camera apparatus comprising:
   a video camera comprising a lens and for generating video signals comprising a plurality of video images comprising picture elements;
   a camera control system for causing adjustment of the video camera, the camera control system comprising means for generating an adjustment indication signal indicative of adjustment of the video camera by the camera control system;
   compression means effecting a degree of compression processing on the video signals, said compression means comprising: means for effecting a degree of spatial compression processing on the video signals; and means for effecting a degree of temporal compression processing on the video signals including means for generating motion vectors in response to the adjustment indication signal;
   a processor for outputting to the compression means, an instruction to vary the degree of compression processing in response to the adjustment indication signal, said instruction to vary the degree of compression processing comprising instructions to vary the degree of spatial compression processing and the degree of temporal compression processing in response to the adjustment indication signal; and
   means for storing the video signals on a storage medium and wherein the instruction to vary the degree of compression processing is stored on the storage medium.

32. For use in a video camera system comprising an adjustable video camera and a controller for adjusting the video camera, the method comprising the steps of:
   generating the video signals comprising a plurality of video images;
   adjusting the video camera and generating an adjustment indication signal indicative of adjustment of the video camera;
   effecting a degree of compression processing on the video signals, thereby generating compressed video signals, said effecting the degree of compression processing comprising: effecting the degree of spatial compression processing on the video signals: and effecting the degree of temporal compression processing on the video signals including generating motion vectors in response to the adjustment indication signal;

outputting to the compression means, an instruction to vary the degree of compression processing in response to the adjustment indication signal, said instruction to vary the degree of compression processing comprising instructions to vary the degree of spatial compression processing and the degree of temporal compression processing in response to the adjustment indication signal.

33. The method of claim 22 wherein the step of effecting a degree of further compression processing comprises the step of effecting a degree of temporal compression of the video signals and herein the processor further outputs an instruction to the compression means to vary the degree of temporal compression in response to the adjustment indication signal.

34. A video camera apparatus comprising:

a video camera comprising a lens, and for generating video signals comprising a plurality of video images;

a camera control system for causing adjustment of the video camera, the camera control system comprising: a remote controller including means for generating a control signal for causing adjustment of the video camera; and means for receiving said control signal and generating an adjustment indication signal indicative of adjustment of the video camera by the camera control system in response to the received control signal;

compression means effecting a degree of compression processing on the video signals, said compression means comprising: means for effecting a degree of spatial compression processing on the video signals: and means for effecting a degree of temporal compression processing on the video signals including means for generating motion vectors in response to the adjustment indication signal;

a processor for outputting to the compression means, an instruction to vary the degree of compression processing in response to the adjustment indication signal, said instruction to vary the degree of compression processing comprising instructions to vary the degree of spatial compression processing and the degree of temporal compression processing in response to the adjustment indication signal.

* * * * *

UNITED STATES PATENT AND TRADEMARK OFFICE
CERTIFICATE OF CORRECTION

PATENT NO. : 5,926,209

DATED : July 20, 1999

INVENTOR(S) : Terry Laurence Glatt

It is certified that error appears in the above-identified patent and that said Letters Patent is hereby corrected as shown below:

On the Title Page, Item [57], abstract, line 6, delete "tiring" and insert --tilting--

Col. 2, line 15, after "signal" delete "-" and insert --.--

Col. 2, line 36, after ";" delete "an&".

Col. 2, line 44, before "s:ope" delete "fill" and --insert-- full.

Col. 3, line 46, after "temporal" insert --.--.

Col. 3, line 62, after "motion" delete "-" and insert --.--.

Col. 3, line 64, after "low" insert --.--

Col. 4, line 28, after "system" insert --.--

Col. 5, line 14, after "ordinary" delete "ski" and insert --skill--.

Col. 5, line 23, after "signal" insert --.--

Col. 5, line 52, after "Standard" insert --.--.

Col. 5, line 67, after "will" delete "-".

UNITED STATES PATENT AND TRADEMARK OFFICE
CERTIFICATE OF CORRECTION

PATENT NO. : 5,926,209

DATED : July 20, 1999

INVENTOR(S) : Terry Laurence Glatt

It is certified that error appears in the above-identified patent and that said Letters Patent is hereby corrected as shown below:

Col. 6, line 33, after "a" delete "-" and after modem insert --.--.

Col. 6, line 52, after "available" delete "from" and insert --form--.

Col. 11, line 2, delete "palming" and insert --panning--.

Signed and Sealed this

Tenth Day of April, 2001

Attest:

NICHOLAS P. GODICI

Attesting Officer    Acting Director of the United States Patent and Trademark Office